May 4, 1926.

A. C. COTY 1,583,392

APPARATUS FOR MAKING PAPER BAGS

Filed August 20, 1921    16 Sheets-Sheet 1

Inventor
Alfred C. Coty
By Attorney
Emery Varney Blair & Stognet

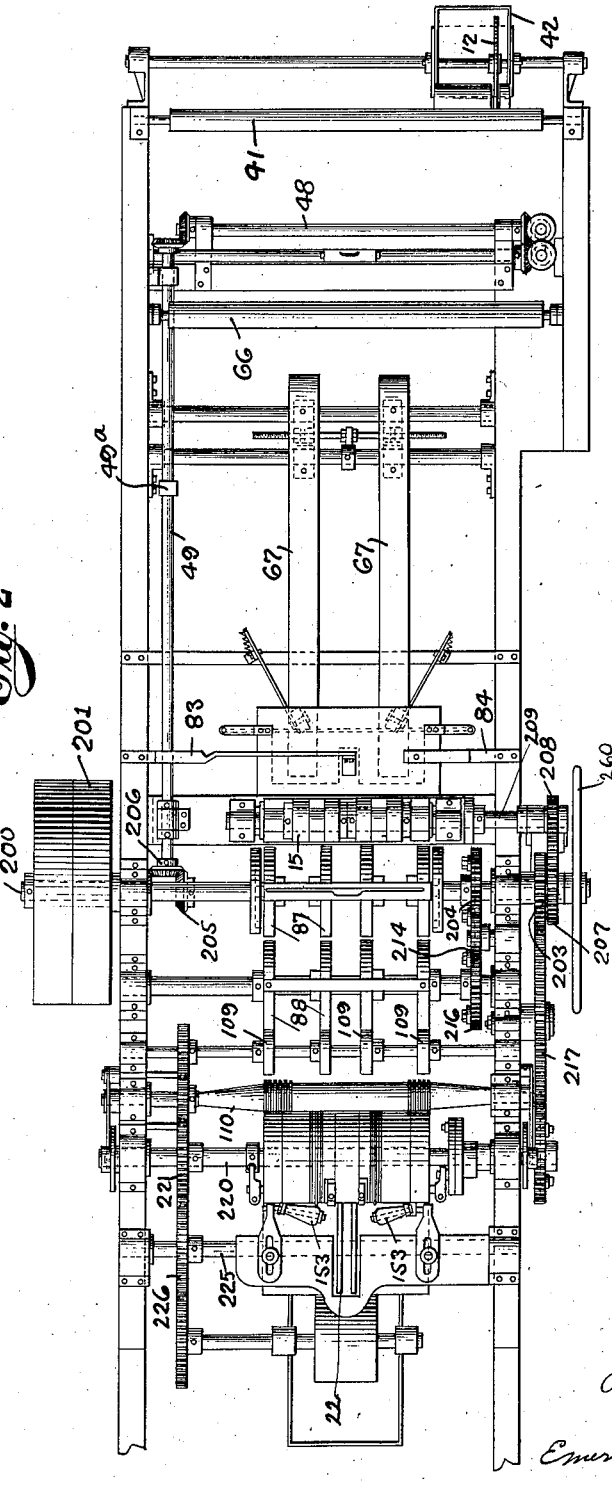

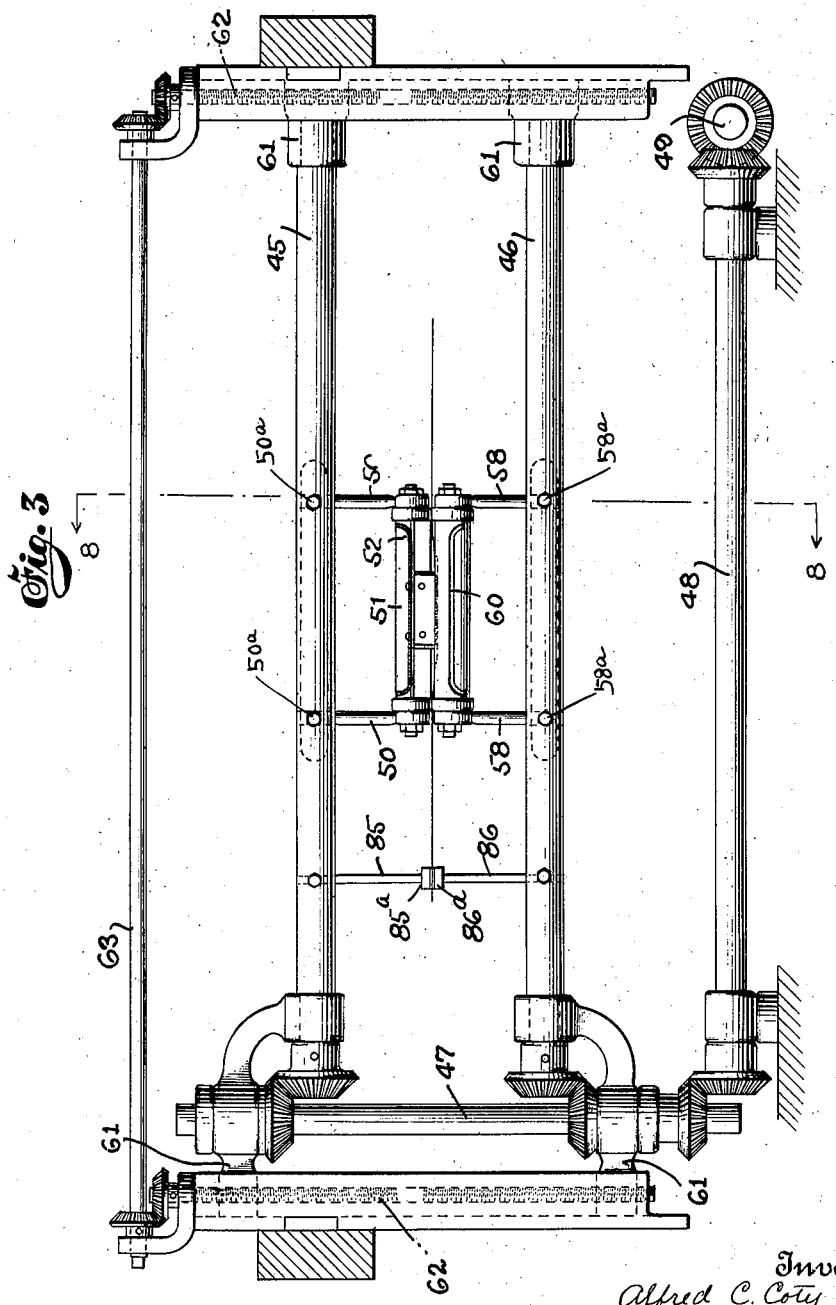

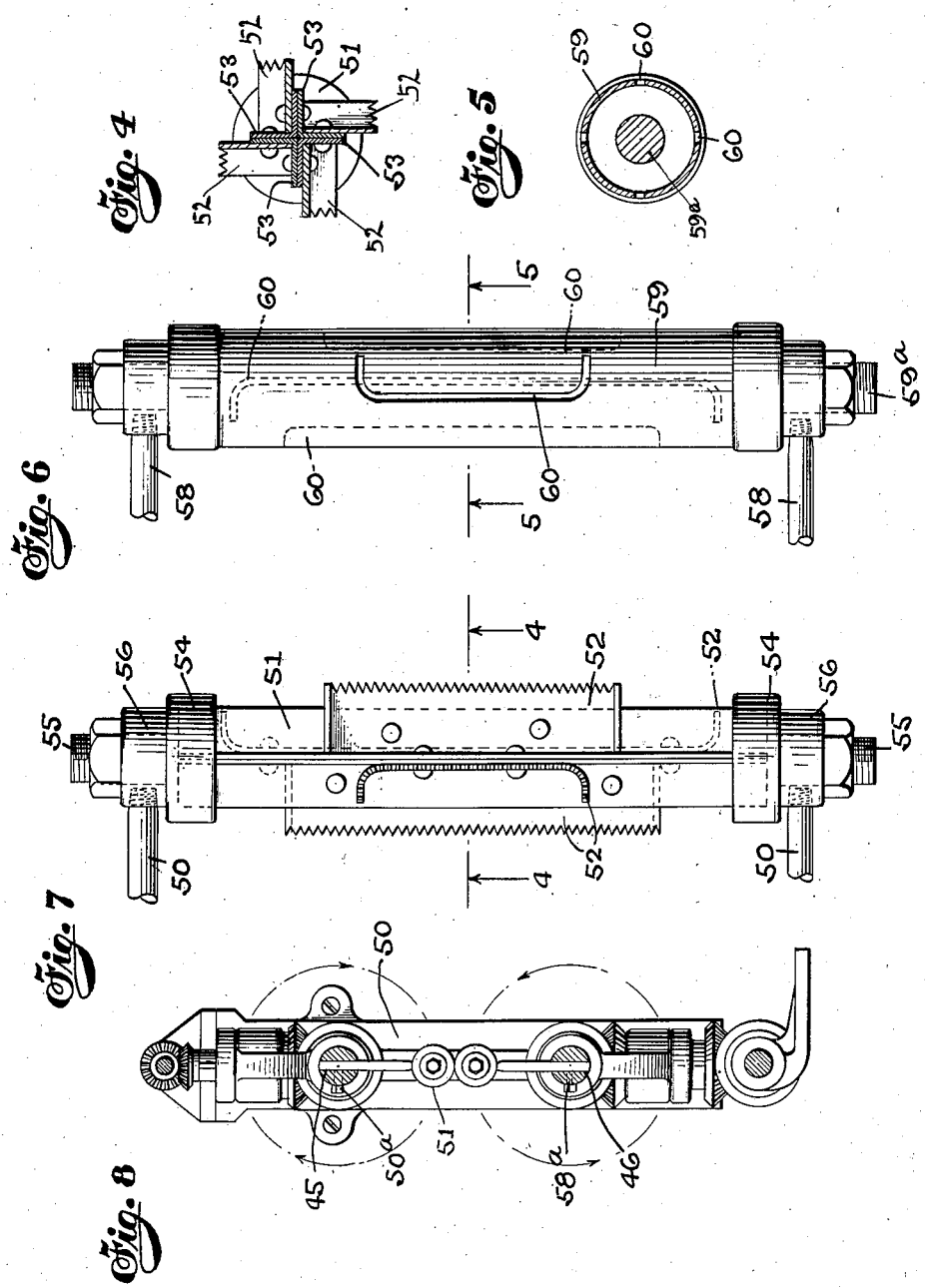

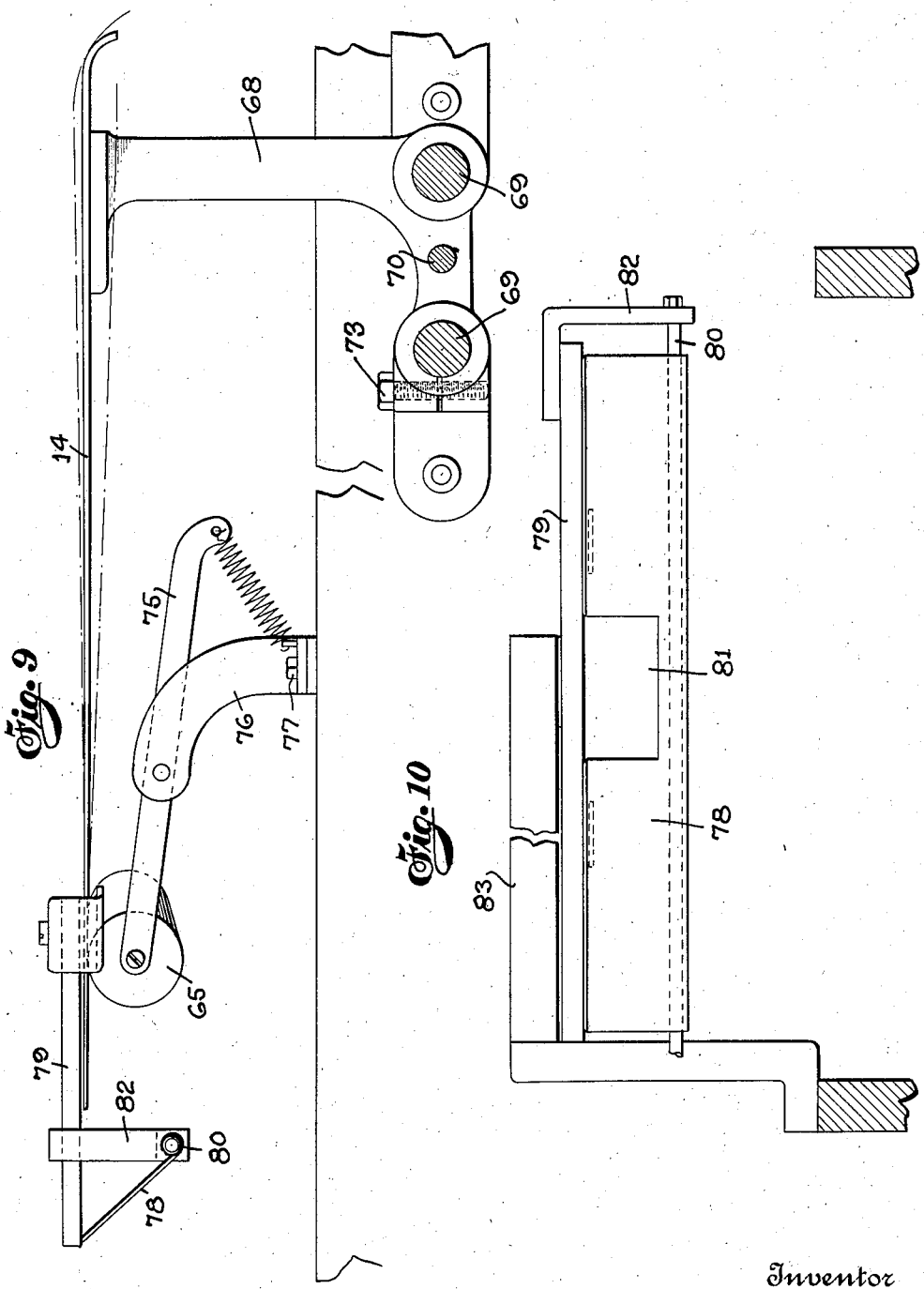

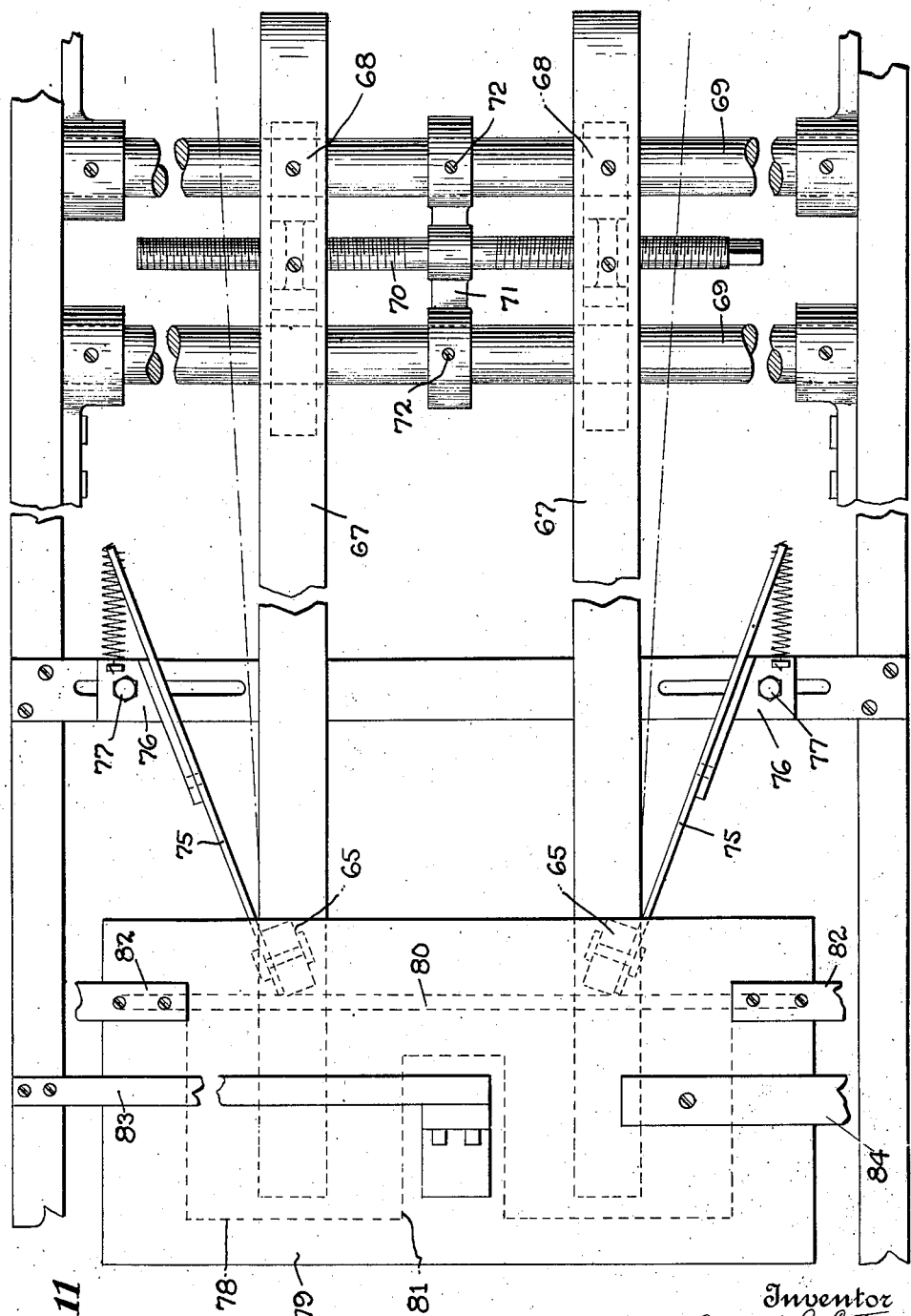

May 4, 1926.
A. C. COTY
1,583,392
APPARATUS FOR MAKING PAPER BAGS
Filed August 20, 1921    16 Sheets-Sheet 7
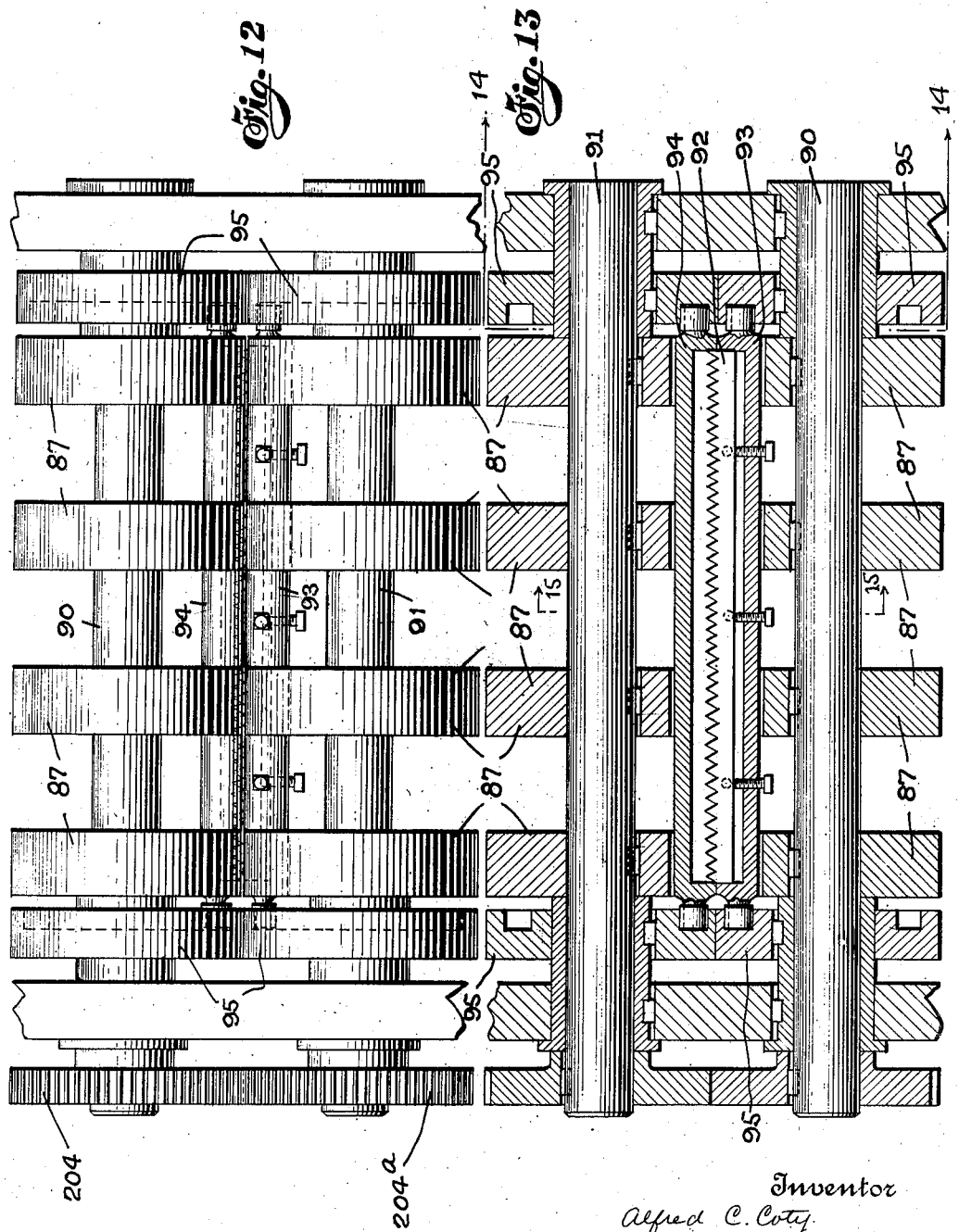

May 4, 1926.
A. C. COTY
1,583,392
APPARATUS FOR MAKING PAPER BAGS
Filed August 20, 1921      16 Sheets-Sheet 8
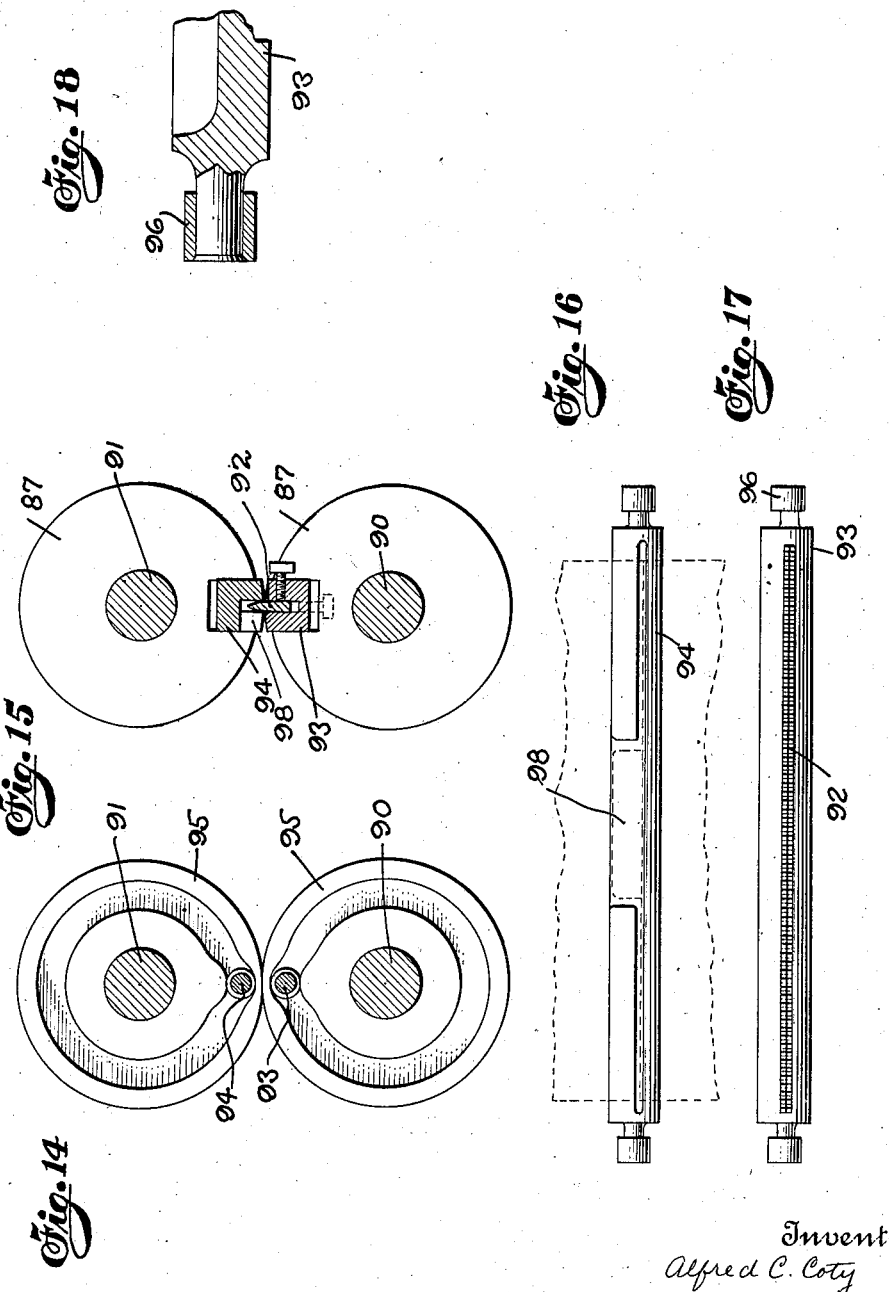
Inventor
Alfred C. Coty
By Attorney
Emery Varney Blair & Hoguet May 4, 1926. 1,583,392
A. C. COTY
APPARATUS FOR MAKING PAPER BAGS
Filed August 20, 1921 16 Sheets-Sheet 9
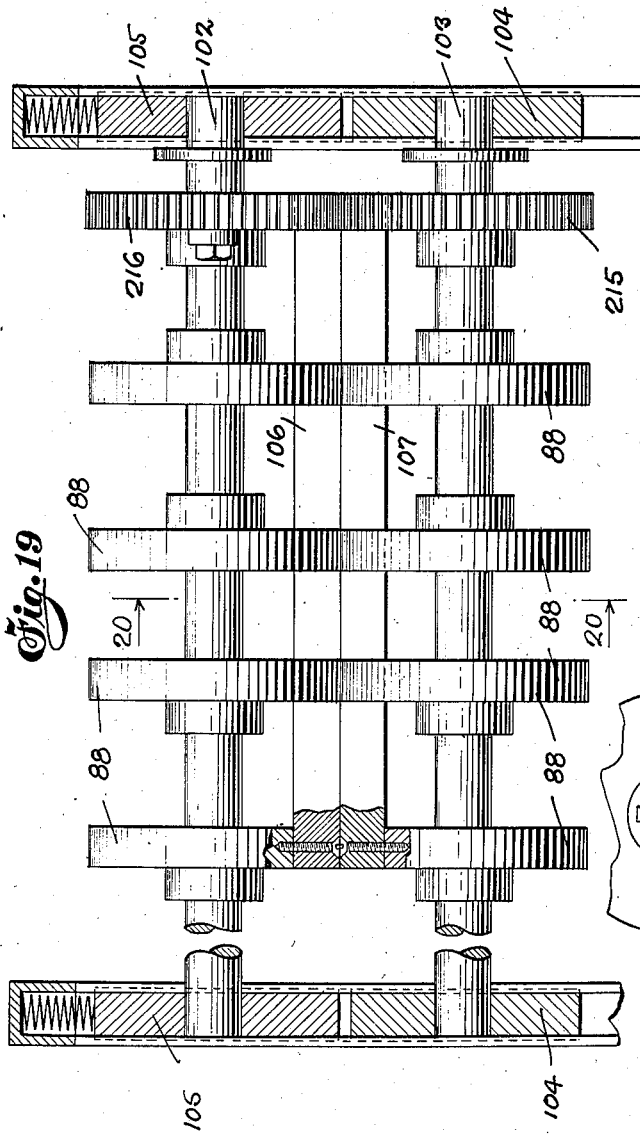
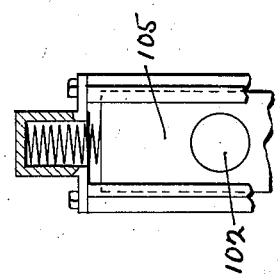
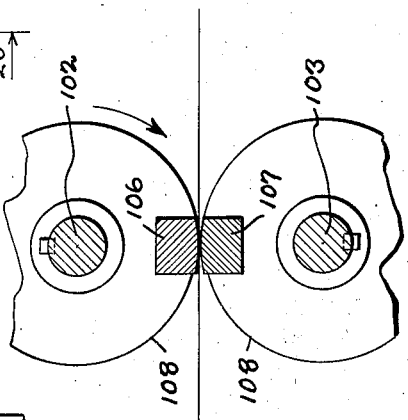
Inventor
Alfred C. Coty.
By Attorney
Emery Varney Blair & Hoguet May 4, 1926.
A. C. COTY
1,583,392
APPARATUS FOR MAKING PAPER BAGS
Filed August 20, 1921   16 Sheets-Sheet 10
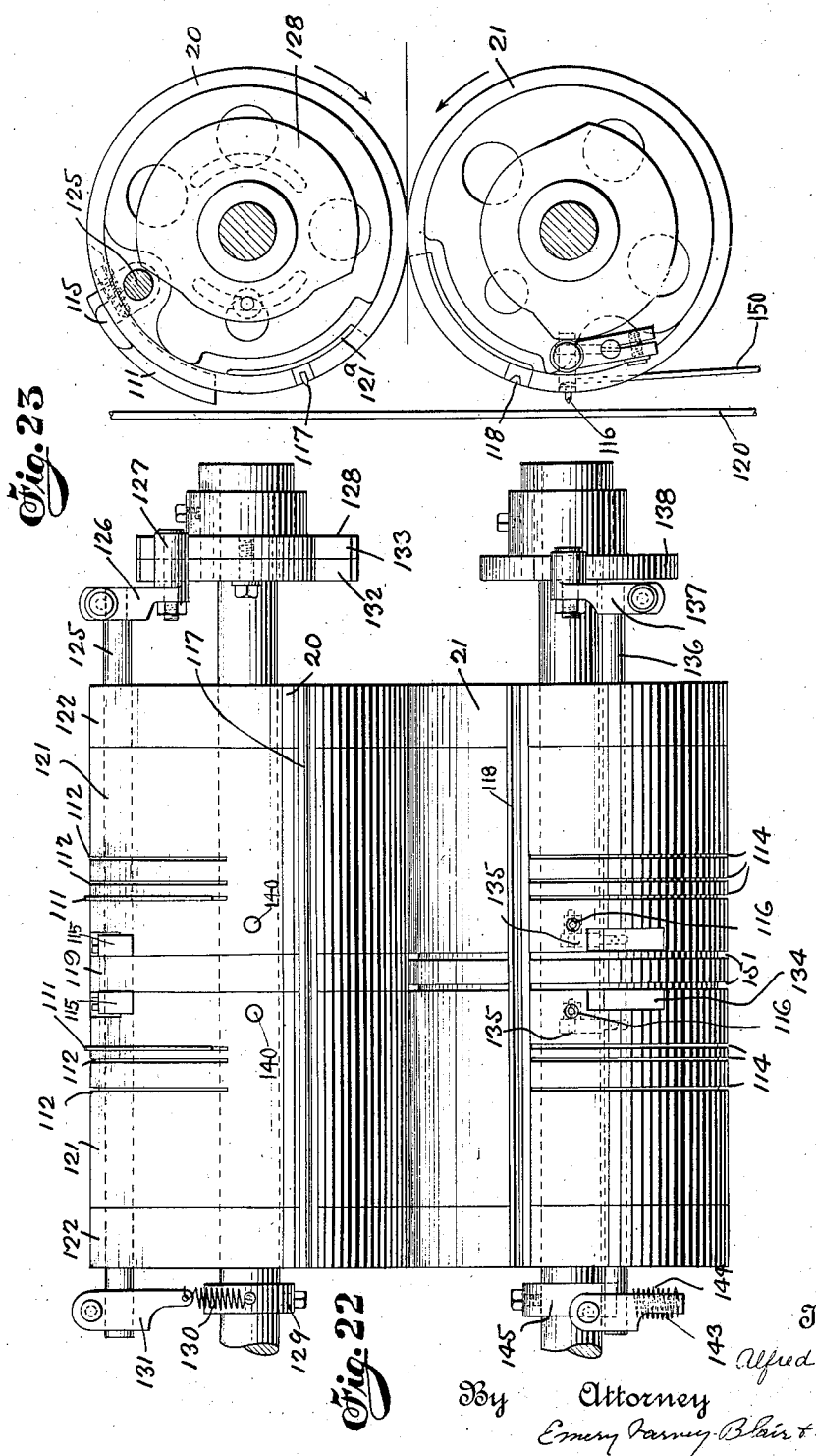

May 4, 1926.
A. C. COTY
1,583,392
APPARATUS FOR MAKING PAPER BAGS
Filed August 20, 1921     16 Sheets-Sheet 11
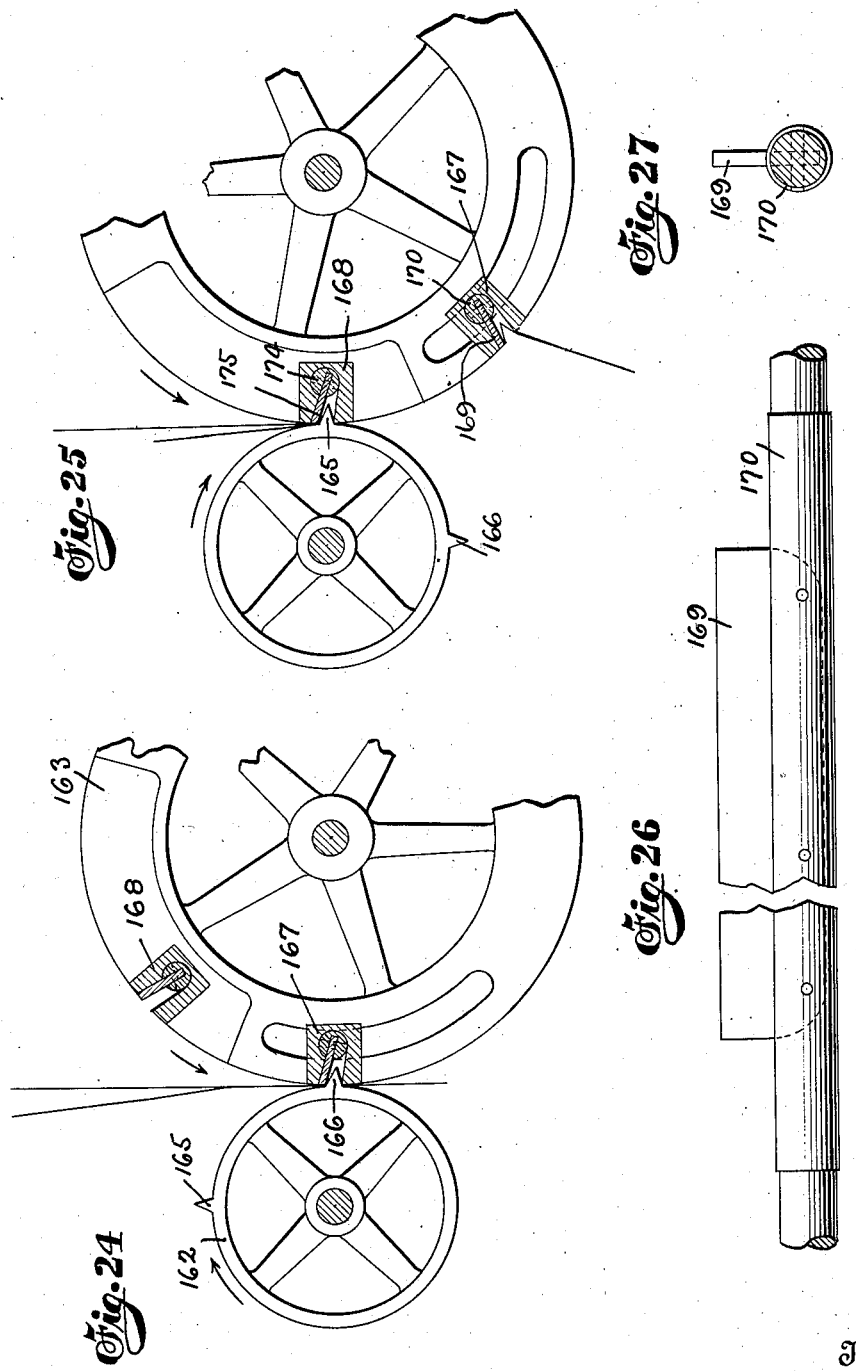
Inventor
Alfred C. Coty
By Attorney
Emery Varney Blair & Noguet

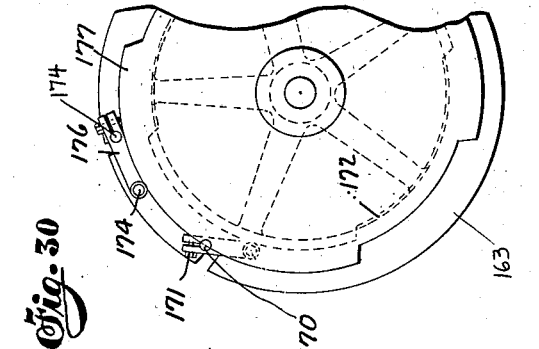
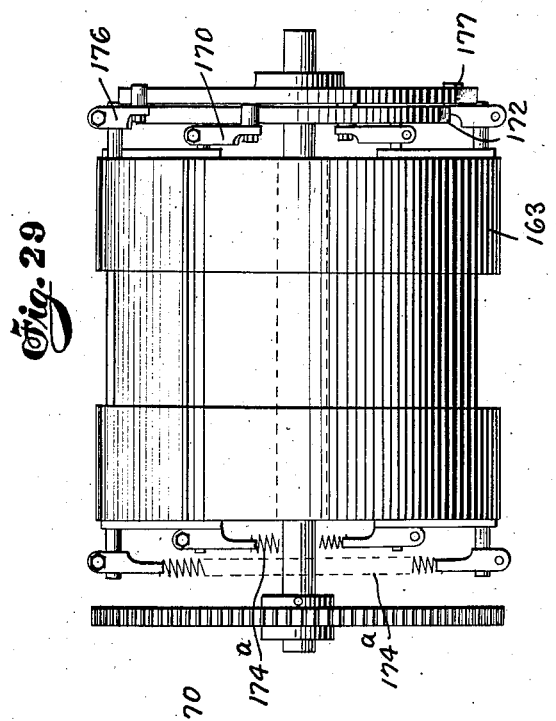
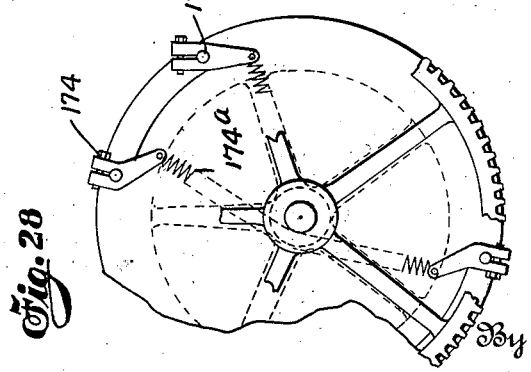
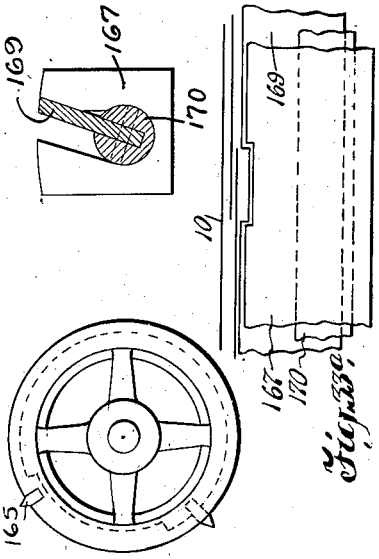
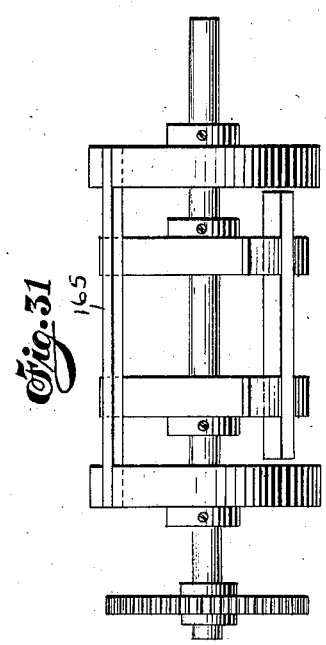

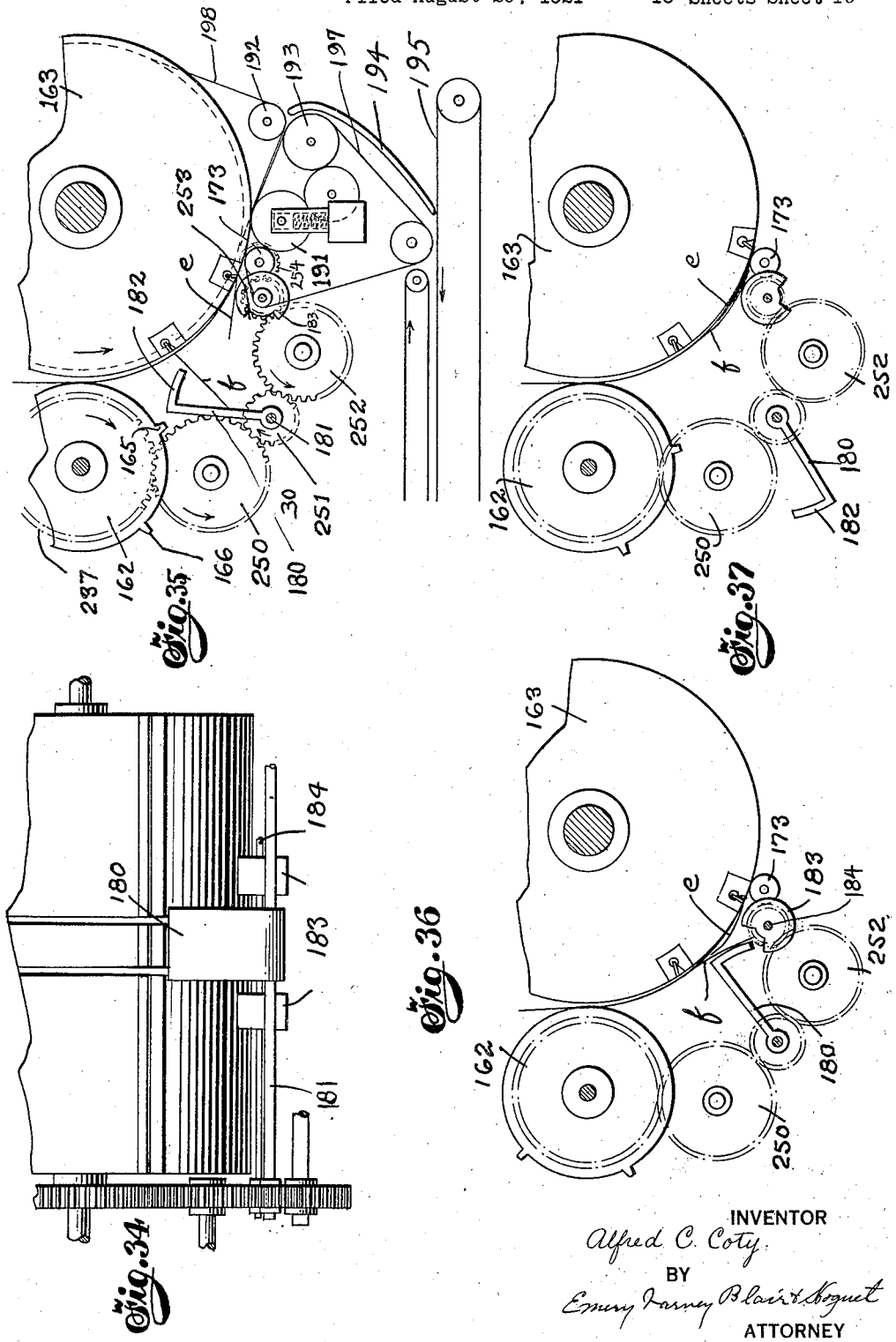

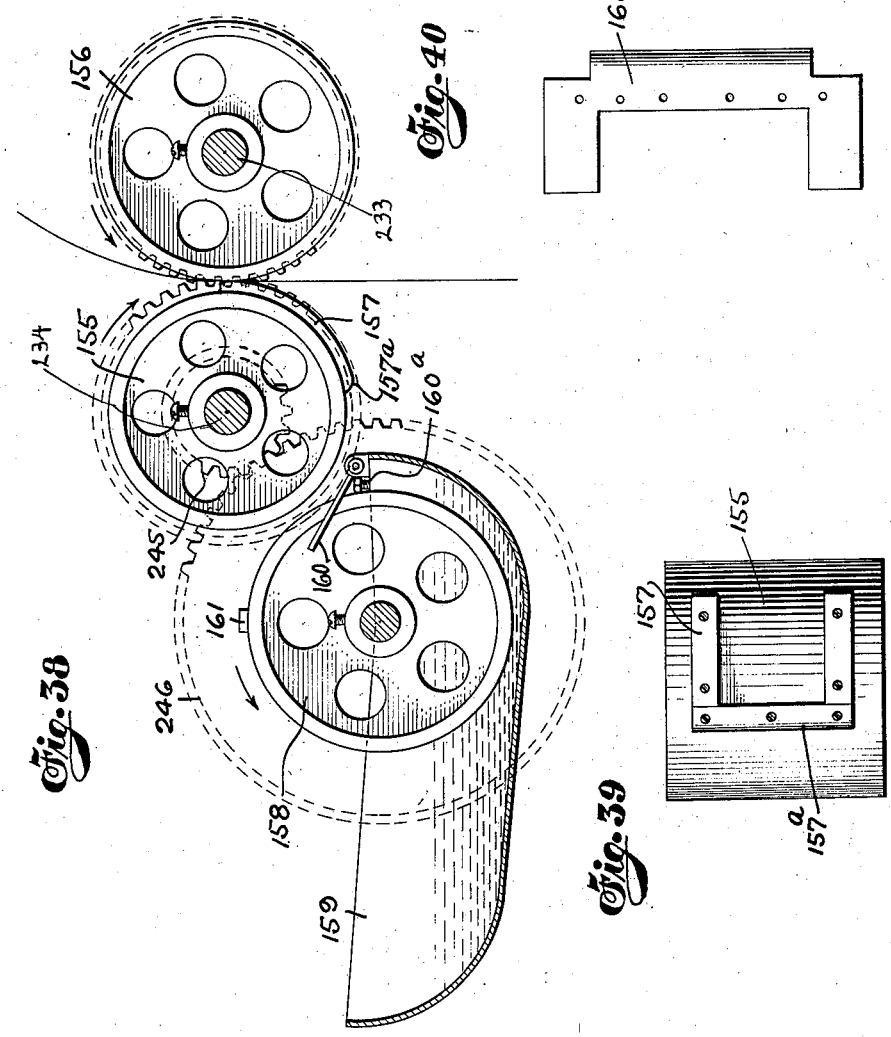

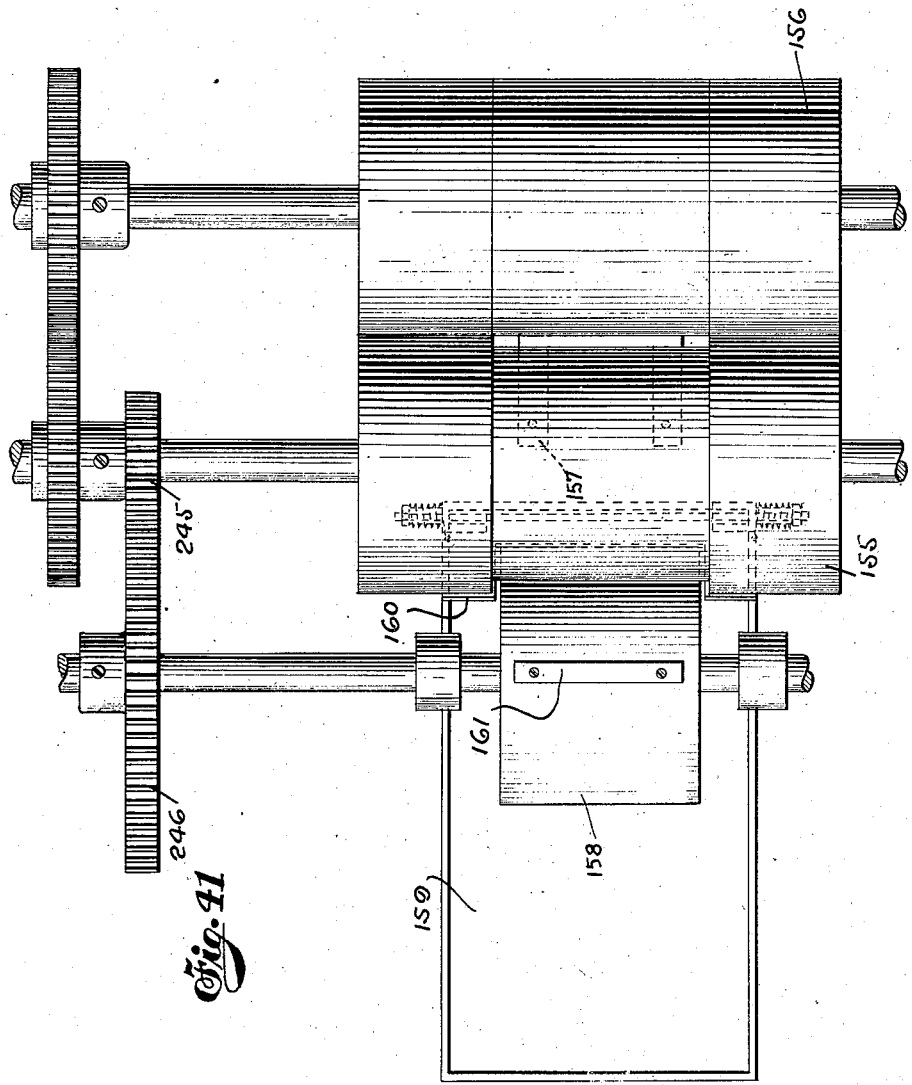

May 4, 1926.
A. C. COTY
1,583,392
APPARATUS FOR MAKING PAPER BAGS
Filed August 20, 1921 16 Sheets-Sheet 16
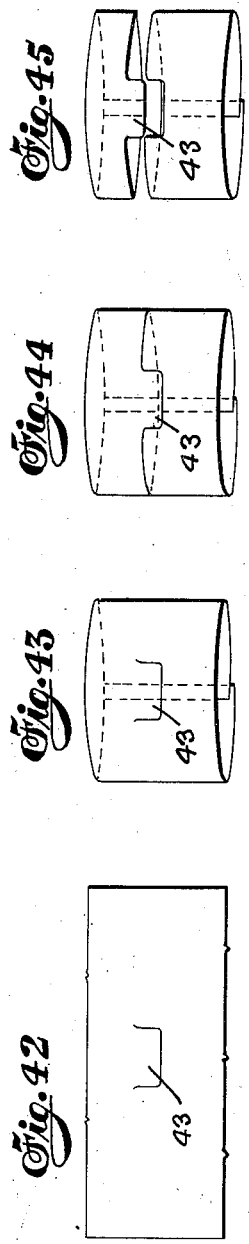
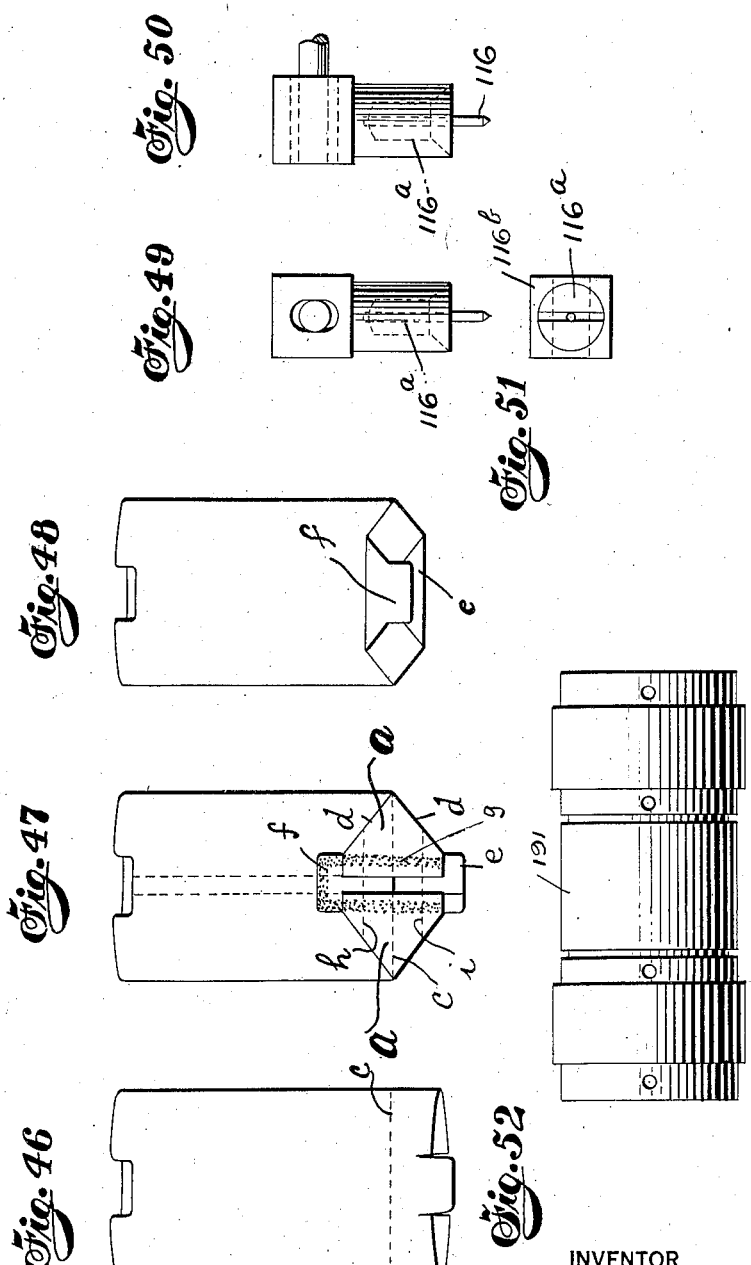
INVENTOR
Alfred C. Coty.
BY
Emery Varney Blair & Hoguet
ATTORNEY

Patented May 4, 1926.

1,583,392

UNITED STATES PATENT OFFICE.

ALFRED C. COTY, OF TOLEDO, OHIO, ASSIGNOR TO THE WATERTOWN BAG MACHINE CO., INC., OF TOLEDO, OHIO, A CORPORATION OF NEW YORK.

APPARATUS FOR MAKING PAPER BAGS.

Application filed August 20, 1921. Serial No. 493,872.

*To all whom it may concern:*

Be it known that I, ALFRED C. COTY, a citizen of the United States, and a resident of the city of Toledo, in the county of Lucas and State of Ohio, have invented an Improvement in Apparatus for Making Paper Bags, of which the following is a specification.

This invention relates to machines for making paper bags. Machines of the type with which this invention is more especially concerned, consist in general of a mechanism for folding a strip of paper longitudinally into a tube which, in its further passage through the machine, is cut into suitable lengths, each of which is folded and pasted on one end to form the closed bottom of the bag. Prior to the forming of the bottom of the bag and conveniently before the tube is cut into lengths, a cut is made which causes a tongue to be formed on one side of the tube at one end of each length and a corresponding notch to be formed on the other end of each length. The tongue forms a convenient means to be gripped by a part of the bottom folding mechanism of the machine. The notch facilitates opening the finished bag in use.

Such machines may be adjustable within certain limits to make possible the manufacture of bags of different sizes upon one machine.

The object of the present invention is to provide an improved machine of the above character, more especially with reference to features which provide more rapid and more reliable continuous operation and to features which will facilitate adjustment of the machine to form bags of different sizes.

One of the features of the invention is the provision of an improved tongue cutting mechanism having a plurality of knives which can be selectively arranged in operative position to cut tongues of different sizes or different shapes, since it is desirable that the size of the tongue should correspond more or less to the size of the bag.

Another feature of the invention is the provision of a cut off mechanism comprising a cut off knife and a cooperating member which supports the work adjacent to the point of cutting, together with an arrangement of pinch bars which hold the work in tension during the instant of cutting.

Another feature consists in an improved folding mechanism for folding the bottom which operates positively by rotative movement only. The elimination of reciprocating parts and substitution of rotative parts only, reduces the power required, reduces the wear, and renders possible more uniform speed at higher rate with less of the tearing and waste, which are likely to occur where the paper-speed changes.

The nature and objects of the invention will more fully appear in the following specification in which will be described a selected embodiment of the invention. This specification should be read in connection with the drawings forming a part hereof and in which, Figure 1 is a side view of a machine for making paper bags, which is constructed in accordance with and embodies the invention.

Fig. 2 is a plan view of the machine shown in Fig. 1. Certain parts are omitted for the sake of clearness.

Fig. 3 is a view in elevation showing the device for cutting the tongue.

Fig. 4 is a sectional view taken on the line 4—4 of Fig. 7.

Fig. 5 is a sectional view taken on the line 5—5 of Fig. 6.

Fig. 6 is a detail view in elevation showing the slotted abutment member or slot roll with which the tongue cutting knives cooperate.

Fig. 7 is a view in elevation showing the several tongue cutting knives carried by a single carrier.

Fig. 8 is a detail sectional view taken on the line 8—8 of Fig. 3.

Fig. 9 is a view in side elevation of the former and associated mechanism.

Fig. 10 is an end view taken from the left of Fig. 9.

Fig. 11 is a plan view of the same mechanism.

Fig. 12 is a view in elevation showing the cut off knives and the mounting and operating mechanism thereof.

Fig. 13 is a sectional view taken in the plane of the sheet through the center of the cut off knives and the shafts carrying the same.

Fig. 14 is a sectional view taken on the line 14—14 of Fig. 13, showing the cams which operate the cut off knives and the slotted member or slot bar cooperating therewith.

Fig. 15 is a sectional view taken on the line 15—15 of Fig. 13, showing the manner of mounting of the cut off knife.

Fig. 16 is a detail view of the abutment roll.

Fig. 17 is a detail view of the knife carrying roll.

Fig. 18 is a detail view showing the manner of mounting a roll upon each end of the knife carrying roll and of the slot bar roll.

Fig. 19 is an elevation partly in section of the feed rolls and pinch bars.

Fig. 20 is a sectional view taken on the line 20—20 of Fig. 19.

Fig. 21 is a detail view showing the yieldable mounting journal bearing for each end of the paper feed roll shaft.

Fig. 22 is a view in elevation of the spreader rolls.

Fig. 23 is an end view of the same.

Fig. 24 is a detail sectional view partly broken away showing the creasing mechanism in position for forming one of the creases of the bottom.

Fig. 25 is a similar view showing the parts in position for forming the next crease of the bottom.

Fig. 26 is a detail view showing one of the creaser plates.

Fig. 27 is an end view of the same.

Fig. 28 is an end view of the creaser roll.

Fig. 29 is an elevation of the same showing the driving gearing and the creaser plate operating cams.

Fig. 30 is a right end view of the creaser roll showing the creaser plate operating cams.

Fig. 31 is a view in elevation showing the cooperating roll.

Fig. 32 is an end view of the same.

Fig. 33 is a detail sectional view showing the creaser plate and the manner in which the same is mounted in the creaser roll.

Figure 1:
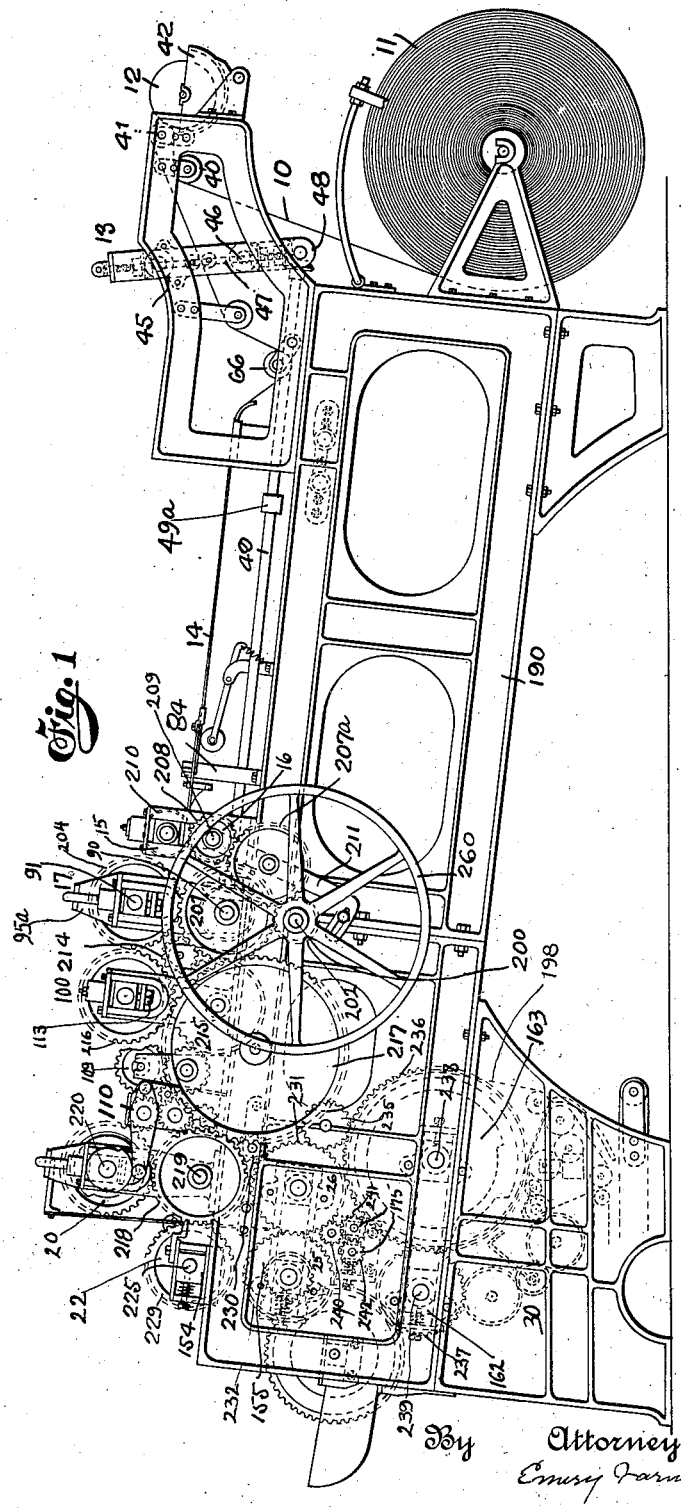

Fig. 33ᵃ is a partial front elevation of the parts shown in Figure 33.

Fig. 34 is a view in elevation of the bottom folding mechanism.

Fig. 35 is an end view of the same showing the driving gearing and showing the parts in position previous to initiating the folding of the bottom.

Fig. 36 is a similar view showing the parts in position for initiating the folding of the bottom.

Fig. 37 is a similar view showing the position of the parts when the folding is substantially completed.

Fig. 38 is a sectional view taken centrally of the rolls shown in Fig. 41 showing the paste pot and paste roll for applying paste to the bag bottom previous to final folding.

Fig. 39 is a detail view of the pasting roll.

Fig 40 is a detail view of the scraper which cooperates with the first paste roll.

Fig. 41 is a plan view of the pasting rolls and paste pot.

Figs. 42 to 48 are views showing the successive conditions of the work as it passes through the machine from the initial cutting of the tongue to the final folding and pasting of the finished bag.

Fig. 49 is a side view of one of the bag engaging pins 116 carried by the lower opening roll.

Fig. 50 is a front view of the same pin, showing also the horizontal stud carried by the rock shaft arm which stud controls the movement of the pin.

Fig. 51 is an end view of the same pin and the carrier in which it is mounted.

Fig. 52 is a detail view in front elevation of the presser roll which cooperates with the larger creaser roll 163 to press the finally folded bag.

I shall first briefly describe the machine indicating the several mechanisms and the work accomplished by each.

A sheet of paper is supplied to the machine from a suitably mounted roll 11. Paste is applied adjacent to one edge by a disc 12, which paste serves to secure the sheet in the form of a tube when later it is folded to such form by the tube forming apparatus. A tongue cutting mechanism 13 operates to cut tongues at substantially the center of the sheet at intervals corresponding to the length of the bag blanks. The sheet is then folded about the former 14 to bring it into the shape of the tube. The tube so formed then passes between the feed rolls 15, 16 which draw the sheet from the roll 11 and along the path described. From the feed rolls, the tube passes to the cut off mechanism 17 which severs it into lengths suitable for bags of the size to be formed. The position of the cut off suitably corresponds to the position of the tongue formed by the cutting mechanism 13. The bag blanks thus formed pass between suitable conveyor rolls and crimping rolls to the opening rolls 20, 21 which open one end of the tubular blank and make the first folds necessary for forming the bottom. The partially folded blank then passes downward between the coacher roll 22 and the lower feed roll 21 to the pressing and pasting rolls 155, 156 which press the folds previously formed and suitably apply paste to the bottom preparatory to the final folding and securing. The blank then passes on to the creasing rolls 162, 163 which crease and partially fold the end flaps of the bottom. These flaps are then folded into overlapped relation by means of the folding mechanism 30 (Figs. 34 to 37) and pressed together between the presser roll 191 and the creasing roll 163.

I shall now describe in detail the illustrative machine shown in the drawings.

Paper is supplied to the machine from the roll 11 (Fig. 12) rotatably mounted in conveniently arranged supporting brackets on one end of the machine. From this roll, the sheet of paper 10 passes upward over suitable rolls 40, 41 where paste is applied to the lap by means of the disc 12 rotating in a paste pot 42 and bearing against the paper adjacent one edge. The disc may be adjusted transversely of the paper as required. The sheet then passes through the tongue cutting device 13 which cuts the tongue 43 (Fig. 42), as is common in machines of this type.

The tongue cutting mechanism, (Figs. 3 to 8), comprises parallel horizontal shafts 45, 46 one above and one below the path of the paper, which shafts are driven in synchronism with each other and with the other mechanism of the machine. As shown, both shafts are driven by beveled gearing from a vertical shaft 47, which is in turn operatively connected with a cross shaft 48 which derives its power from the shaft 49 extending longitudinally of the machine. The upper shaft carries two arms 50, 50 held in adjusted position by set screws 50ª, 50ª, at the ends of which arms is mounted a head 51 bearing a plurality of knives 52, 52 of different lengths longitudinally of the head, curved at their ends, for cutting tongues of different widths in the sheet. Four knives are shown in the drawing. The head, which is adjustable to bring each of the knives into operative cutting position, may be of any suitable construction. As shown, it is built up of angle irons 53, 53 secured in heads 54, 54 formed with stud bolts 55, 55 which extend through collars 56, 56 on the ends of the supporting arms 50, 50. In use, the head is adjusted to bring the desired knife to cutting position and the nuts on the stud bolts are tightened to hold the head in adjusted position by friction. The lower shaft 46 similarly carries two arms 58, 58 held in adjusted position by set screws 58ª, 58ª, in the ends of which arms is mounted a cooperating slotted head or slot roll 59, so designed that each tongue cutting knife will in use project into a suitably shaped slot. In the structure illustrated, separate slots 60, 60 are provided for the several knives and the head is made adjustable in substantially the same manner as the knife carrying head. The head is shown as comprising a tube and a shaft 59ª extending therethrough and through collars on the ends of the arms 58, 58.

When bags of different lengths are being made, the sheet 10 is passed through the machine at speeds which differ relative to the speed of the drive of tongue cutting mechanism. It is desirable to make provision whereby the movement of the knife and slotted head will be the same as the speed of the paper. This is accomplished, in the machine shown, by making the shafts 45 and 46 adjustable toward and from each other and by making the arms 50 and 58 adjustable in the shafts to vary the effective radii.

As shown, the shafts are carried by journals 61, 61 which are slidable in ways on opposite sides of the machine. These journals are movable vertically by means of right and left threaded screw shafts 62, 62 engaging therein, said shafts being driven by beveled gears from a cross shaft 63 having a square end for manual adjustment.

It is desirable to provide an adjustment to vary the relative positions of the cut made by the cut off knife and the cut made by the tongue knife, in order that when bags of different lengths are made, the two cuts may be correctly positioned. This is accomplished by means of an adjustable shaft coupling 49ª, (Fig. 1) connecting two parts of the shaft 49. The drive may thus be adjusted to make the distance between the cut off end of the tube and the cut made by the tongue knife always a multiple of the required bag length.

Ordinarily in machines of this character, inconvenience is experienced because the paste of the longitudinal lapped joint squeezes out at the point where the cut off knife cuts the tube into lengths. In order to avoid this inconvenience, I have provided a device which spreads the paste away from the point on the tube where the cut off knife operates to sever the tube into lengths, so that the paste cannot flow out from between the lapped edges of the paper. Conveniently, the device may be carried by the shafts 45 and 46 of the tongue cutting mechanism (Fig. 3). As shown, adjustable arms 85 and 86 carry pads 85ª, 86ª. These arms are similar to the arms which carry the tongue knives and the slot bar. The pads 85ª, 86ª engage the paper on opposite sides along the line of the paste applied by the disc 12. These arms engage the paper somewhat behind the point where the tongue cutting knife engages the paper and at the point where the cut off knife later engages it.

The sheet is next folded into a tube by the tube forming apparatus. The sheet runs over the top of the former 14 and is folded downwardly therearound on both sides. Tube seam rolls 65, 65, (Figs. 9 and 11), which are set at an angle to the direction of movement of the paper and spring pressed upwardly, are arranged to draw the edges of the paper in closely around the former in overlapped relation. The paper is drawn to the former preferably at an angle of 45 degrees to the plane of the former, as shown in Fig. 1 from a guide roll 66 positioned to provide this arrangement.

In order that different widths of tube may be formed, the former is made adjustable as to its width. As shown, the former consists of two parallel shoes 67, 67, (Fig. 11) which are movable toward and from each other to provide in effect a former of the desired width. The two shoes are carried by similar brackets 68, 68 slidably mounted on transverse shafts 69, 69. The position of the brackets on the shafts is determined by means of a transverse right and left screw 70 which is arranged to move the two former shoes 67, 67 simultaneously and in opposite directions. The right and left screw 70 is rotatably mounted in a bracket 71 firmly secured to the shafts 69, 69 by set screws 72. A clamp screw 73 may be provided to hold each former shoe in adjusted position. The tube seam or folding rolls 65, 65 are adjustable transversely of the machine so as to be readily placed in proper position to engage the paper on the under side of the shoes. As shown, the rolls are supported at the ends of arms 75, 75 which are pivoted in brackets 76, 76 movable transversely of the machine and which may be secured in adjusted position by means of the clamp screws 77, 77 which extend through slots in the transverse member, to which these brackets are attached.

As the sheet leaves the former, the tube is pressed flat and wrinkles are smoothed out between the upwardly spring pressed smoothing plate 78 and the underside of the table 79, beneath which the sheet passes as it leaves the former. The plate 78 consists of a flat plate of spring sheet metal secured at its lower edge to a square transverse rod 80 and extending diagonally upward and engaging at its upper edge against the table 79, just beyond the ends of the former shoes. The center portion of the plate is cut away as indicated at 81, (Fig. 11) so that it will not engage the lapped seam of the tube. The transverse rod 80 carrying the smoothing plate is adjustably supported in brackets 82, 82 secured to the table 79 and extending downwardly therefrom. Adjustment of the rod 80 varies the pressure of the plate against the tube. The table is supported by means of brackets 83, 84 (Figs. 1, 2, 10 and 11) secured to the top side thereof and to the frame.

The tube next passes between the feed rolls or draft rolls 15, 16 and to the cutting off mechanism 17 which cuts the tube into lengths for forming bags of the desired size. The upper roll 15 (Fig. 2) is made in sections adjustable on the shaft. In use, these sections are preferably so positioned that the lapped seam and the tube edges are not pressed between the rolls. The tube passes from the feed rolls to the cutting knife rolls 87, 87 (Figs. 2, 11, 13) and thence to the pinch bar rolls 88, 88 (Figs. 2, 19) which latter are arranged to cooperate with the feed rolls 15, 16 to hold the tube in tension for the cutting off operation. The cutting off mechanism comprises parallel shafts 90, 91 driven in synchronism with each other and with the other elements of the machine by means of the gears 204, 204$^a$ secured to the shafts 90, 91 on one side of the machine. These shafts carry two sets of rolls 87, 87 which are arranged in pairs one on each shaft. The two rolls of each pair are slightly spaced so as not to grip the paper tightly, because ordinarily the surface speed of these rolls is greater than that of the paper. A cutting knife 92 is carried by the rolls of the lower set. As shown, the knife is adjustably mounted in a cross head 93 movable radially in slots in the rolls. A cooperating slotted head or slot bar 94 is similarly carried in the rolls of the upper set. The ends of the crossheads 93, 93 project into the grooves in the stationary cams 95 at opposite sides of the machine. The cams may be supported on the shafts and held against rotation by connection with a bracket 95$^a$ (Fig. 1) extending across the machine above the knife mechanism. These cams are so designed that as the rotation of the shafts brings the knife into operative position to sever the tube, a relative movement of translation is provided. Preferably, both the knife 92 and the cooperating slotted head 94 are moved toward each other simultaneously. By making both movable, the movement of each is relatively small and the cams therefore present less abrupt changes of curvature and require less power. The ends of the knife carrying head 93 and of the cooperating slotted head 94 may be and preferably are provided with antifriction rolls 96 (Fig. 18) which engage the cams 95 and reduce the wear.

It is desirable in the particular machine illustrated to avoid severing the tongues when the cut off knife operates to sever the tube into lengths. For this reason, the slotted head 94 is cut away for a length at the center equal to the length of the longest tongue cutting knife, as indicated at 98 (Figs. 15 and 16). By this arrangement, the tube will be completely severed. The tongue, therefore, will not be cut off, since not being under tension, it will bend downwardly into the cut away portion 98. Preferably, the movement of translation radially outward, which is given to the knife and slot bar to make a cut, brings the slot bar merely flush with the members 87 which may be considered rolls or disks according to one's point of view. The knife may be given projecting movement which brings it sufficiently beyond its rolls to cut effectively. The driving gear of the slot bar shaft is arranged to permit circumferential adjustment to insure accurate synchronism of the knife and slot bar.

The pinch bar mechanism 100 which, as above noted, hold the tube under tension during the operation of the cutting off knife, comprises upper and lower parallel shafts 102, 103, (Figs. 19, 20) the lower of which is supported in fixed bearings 104 and the upper of which is supported in bearings 105, which are capable of a slight vertical movement against the action of the springs that urge the same downwardly to hold the pinch bars 106, 107, and the pinch bar rolls 88, 88 in contact with each other. The downward movement of the upper pinch bar shaft is limited as by adjustable stop screws 113, one of which is shown in Fig. 1. The pinch bar rolls or discs are arranged in two sets, one on the upper shaft 102, and one on the lower shaft 103. The rolls are of generally circular shape, but are reduced slightly along their periphery, as indicated at 108 (Fig. 20), for about one half of the circumference. The surface speed of these rolls is ordinarily faster than that of the paper as it enters therebetween. The reduced part of the rolls permits the resultant slipping. But when the bars grip the paper and thereafter these rolls act as feed rolls to carry the several lengths of the paper tube forward. The portions of the rolls shown at the right of the pinch bars in Fig. 20, which are operative for this purpose, are full size and grip the paper firmly.

The bars are normally timed to first engage the paper slightly before the cut off knife operates. This results, when the surface speed of these rolls is greater than that of the feed rolls 15, 16, in taking up the slack or drawing taut the length of tube between the bars and the feed rolls before the knife cuts. The greater speed of the pinch bars and rolls also pulls the tube in a way to insure complete severing, even if the knife fails to cut clean. When the feed rolls are running relatively slowly as for short bags, it is desirable to reduce the period of time between the initial gripping by the pinch bars and the cutting by the knife. This may be done, as shown, by making the gear 216 adjustable circumferentially on the shaft 102, as conventionally indicated in Fig. 19.

The several lengths which constitute bag blanks, pass between the conveyor rolls 109 and the corrugating or crimping rolls 110 (Fig. 1) to the opening rolls 20, 21 (Figs. 22, 23) which make certain cuts to facilitate the shaping of the bottom and also make the first folds for the forming of the bottom. The upper opening roll 20 carries a pair of knives 111, 111 which are adjustable in that they can be placed in any of the several slots 112 formed in the roll for this purpose. These knives operate in corresponding slots 114 in the lower roll 21 to cut the tube at the end, to facilitate subsequent folding in the forming of the bottom. The upper opening roll 20 carries a pair of gripping fingers 115 which are arranged to grip the tongue 43 formed on the upper thickness of the tube to draw the same upwardly around the roll as the roll rotates. The lower roll 21 carries a pair of pins 116 which pierce the paper and afford a sufficient grip to draw the lower thickness of the tube downwardly as the roll rotates. The grip of the fingers 115 is relatively positive and also acts at the time of the opening of the end of the tube in a direction longitudinal of the length of the pins 116. The upper thickness of the bag is therefore easily pulled off from the pins to open the end of the tubular blank. The upper thickness of the tube is pulled upwardly and the lower thickness is pulled downwardly. The resultant action is an opening of the tube with a consequent infolding of the side portions $a$, $a$ (Fig. 47). To further determine the direction and shape of the folds produced by the opening rolls 20, 21, a transverse crease is formed by a creaser blade 117 carried preferably by the upper roll and engaging a corresponding slot 118 in the lower roll.

The creaser blade 117 and slot bar 118 are adjustable peripherally of the opening rolls 20 and 21 to accommodate the opening rolls to the making of bags of different widths of bottom. In the construction illustrated, the creaser blade 117 is carried in a center ring 119 and end rings 122 and the slitter rings 121, 121 are formed with arcuate recesses 121$^a$ to permit the adjustment. The creaser slot bar 118 is similarly mounted for adjustment in the lower opening roll 21.

The creaser blade is preferably slightly thinner at the point where it engages the lapped longitudinal seam of the bag blank to avoid squeezing out the paste at this point. The crease formed by this creaser is indicated by the line $c$ in Figs. 46 and 47. A former 120 (Fig. 23) consisting of a flat upright member positioned adjacent the opening rolls prevents the bag end from springing closed after the gripping fingers are released. This operation gives to the bag bottom substantially the form shown in Fig. 47 having the diagonal folds $d$.

The gripping fingers 115 (Fig. 22) of the upper opening roll 20 are rigidly secured to a rock shaft 125 extending longitudinally through the roll. An arm 126 rigidly secured on one end of the rock shaft carries a roller 127 which engages a stationary cam 128 to control the rock shaft and thereby the gripping fingers. The roller 127 is held against the cam 128 through the action of a spring 130 acting upon an arm 131 at the opposite end of the shaft. The inner end of the spring is attached to a collar 129 adjustably secured to the shaft thereby permitting adjustment of the tension of the spring. The spring tends to rotate the shaft to hold the fingers in gripping position. The force of the grip is therefore determined by the tension of this spring. The cam is so designed that the gripping fingers are open at the time the end of the bag blank is first presented to and enters between the opening rolls, but are closed soon thereafter and remain closed till released to permit the blank to pass downwardly to the creasing rolls or until the blank has been pulled therefrom. Obviously, different cams may be substituted or the one cam may be adjusted within certain limits to adapt the machine for the manufacture of bags of different sizes. As shown, the cam comprises two parts 132, 133 adjustable relatively to vary the time of operation of the fingers. The lower roll 21 is recessed to receive the gripping fingers of the upper roll, as indicated at 134 in Fig. 22. The pins 116 of the lower opening roll 21 move radially and are controlled by arms 135 carried by a rock shaft 136 having an arm 137 engaging a fixed controlling cam 138 at one end of the roll. The construction of the pins is shown in detail in Figs. 49—51. The pin 116 fits in a drilled hole in a screw 116$^a$ secured in the pin carrier 116$^b$. This cam is so designed that the pins are projected to perforate the paper while it is engaged between the two rolls and remain projected until the bag is engaged by the coacher 22, when they are withdrawn. The withdrawal in a radial direction tends to keep the pins clean and free of paste, although they may prick through the paper on the line of the paste in the lap joint. The pins project into recesses or slots in the upper roll, as indicated at 140 in Fig. 22. The arm 137 is normally held in engagement with the cam 138 by means of a spring 143 connecting the arm 144 at one end of the shaft 136 to a collar 145 adjustably mounted on the shaft which carries the roll 21. To prevent the bag from following around the lower forming roll, rods or wires 150 project upwardly into circumferential slots 151 formed in the roll for this purpose.

The pins are removably mounted in slide blocks by means of screw pins centrally drilled to receive the pins.

After the opening rolls have performed their function, the blank with its open end passes downward between the lower former roll 21 and the coacher 22 to the first creaser rolls 155, 156. The former 120 engages the center of the open bag end and prevents closing of the same while the conical rolls 153 (Fig. 2) engage and hold in the inwardly turned side portions, during this downward movement. The creaser rolls 155, 156 which act also as pasting rolls press the partially formed bottom and complete the forming of the diagonal folds $d$ (Fig. 47). The roll 155 is made in three parts (Fig. 41). The two outer parts engage the roll 156 with sufficient pressure to feed the bag blanks and to form the folds $d$ (Fig. 47). The center part is of smaller diameter and carries a U-shaped paste pad 157 (Fig. 39). This pad is rounded at its forward edge to facilitate proper cooperation with the less rapidly rotating paste roll 158; the pad carries paste from the surface of the paste roll to apply the same to the bag bottom along the U-shaped line indicated at $g$ in Fig. 47. The paste roll 158 rotating in the paste pot is engaged by a regulator or guide 160 spring pressed against the roll, which serves to distribute the paste and limit its thickness on the roll. The innermost position of the regulator may be determined by a stop screw 160$^a$. Preferably, a cleaner bar or paste wiper 161 is provided on the roll to engage the scraper occasionally to break away any lumps which may collect. The wiper is not high enough to engage the pasting roll. This paste roll 158 is geared to run much more slowly than the roll 155. It may rotate, for example, at one fourth the speed.

The forward edge of the paste pad is rounded to present a relatively rounded surface to the paste roll with which it contacts. This expedient causes paste to be properly transferred from the surface of the paste roll to the more rapidly moving paste pad. It makes possible the use of a paste roll which rotates relatively slowly in the paste box and does not churn the paste unduly.

If the dimensions and relation of parts of the machine are such that when bags of the greatest length for which the machine is designed are being made, the blank is still engaged by the pasting rolls, then these rolls should preferably be relieved (cut away) slightly at the then engaging point to permit slipping to allow the bag to be drawn forward by the creasing mechanism.

The bag blank partially folded and with paste applied passes downward between the conveyor rolls 175, one of which is yieldably mounted. As shown, the forward roll is pressed rearwardly by an adjustable spring which can be so adjusted that the blanks are gripped with sufficient pressure to satisfactorily convey them. The pressure, however, is not so great but that when a blank is pulled by the creaser rolls, it can slip between the conveyor rolls. This arrangement is adapted as a convenient method of providing for slipping of the bag when pulled by the creaser rolls. It is of course merely an illustrative arrangement for permitting desirable slipping.

The forward conveyor roll is suitably cut away to avoid contact with the line of freshly applied paste on the blank. From the conveyor rolls, the blank passes to the creaser rolls 162, 163, wherein the two oppositely projecting ends, $e$, $f$, are creased transversely, as indicated at $h$, $i$, Fig. 47, to facilitate folding inwardly into overlapping relation. The smaller roll 162 has two projecting ribs or creaser blades 165, 166, which engage in corresponding slots in the creaser boxes 167, 168 carried by the larger roll 163. (See Figs. 24 to 33.)

One or both of the creaser boxes, and one or both of the cooperating creaser blades, are adjustable circumferentially of the rolls to accommodate bags of different sizes. As shown, the forward creaser box is carried by adjustable center members of the roll and the creaser box rock shaft extends outwardly through slots in the cylinder ends. The cooperating creaser rib is similarly adjustable.

In each slot, a blade 169 carried by a shaft 170 is movable to grip the fold formed in the slot. The forward shaft 170 has on its outer end an arm 171 which engages a stationary cam 172 designed to cause the creaser blade 169 to grip the fold as the rib of the smaller roll is retracted from the slot and to hold the same for a predetermined period. The second shaft 174 has a similar arm 176 engaging a similar cam 177 designed to cause the blade 175 to grip and to release its fold at suitable times. Preferably the forward fold is released by the blade 169, when it is close to, but before it is engaged by the tape roll 173 to be described. It is one of the features of the invention that the fold is released before the roll 173 is engaged. If the fold is still gripped in the creaser box at the time the bag enters between the rolls 163 and 173, there is a tendency for the longitudinal seam to be spread open at the fold thereby causing a leaky bag.

The creaser box blades preferably both move forwardly with respect to the direction of rotation of the roll to pinch the folds. In this arrangement, the action of the forward creaser box tends to draw the blank forward and smooth out any wrinkles. The action of the second box tends to draw the rear part of the blank further forward to form the crease without pulling backward to such an extent as to pull the blank out of the forward box. The arrangement of both creasing devices in one roll materially simplifies and improves the construction even aside from the other advantages which obtain in the arrangement thereby made possible. Preferably, the creaser blades and the creaser boxes are relieved or cut away at the points where the longitudinal tube seam and line of paste are engaged to avoid squeezing the paste away from such points and thereby causing a leak in the bag when finished, as shown in Figure 33ª.

As shown, the creasing rolls 162, 163 are of different sizes, the one twice the diameter of the other in order to give sufficient space for the folding of the creased portions and at the same time to provide a roll of relatively large diameter against which the bags are folded. For making large bags, for example, 36 inches long and 20 inches wide, the larger roll may be 24 inches in diameter and the body of the smaller roll may be enough smaller than 12 inches in diameter to afford proper meshing of the ribs 165, 166 in the creaser box slots. In the machine illustrated in the drawing, the diameter of the smaller roll to the outer points of the creasing ribs is 12 inches and the diameter of the larger roll is 24 inches. The creaser ribs 165, 166 may be $\frac{3}{16}$ths of an inch in height. It will be noted that by this arrangement, the distance between shafts is such that special gears are required for driving the smaller creaser roll 162 from the larger creaser box roll 163. This requirement is sufficiently satisfied by cutting the teeth of the gear on the smaller roll shaft deeper. The creaser rolls are slightly spaced so that the bag blank is not tightly held therebetween, thus allowing a slight slipping when necessary in the operation of the rolls. The larger roll 163 has two sets of creaser boxes so positioned that the creasing ribs 165, 166 engage corresponding slots at each rotation. As shown, the creaser box blades are spring pressed to folding or creasing position by springs 174ª connecting arms secured to the free ends of the creaser box blade shafts on opposite sides of the roll. The cams operate in opposition to these springs to open the blades and release them at suitable times. The first creasing blade 169 after forming the crease, continues to grip the blank as above noted to carry the same forward between the larger creasing roll 163 and a cooperating tape roll 173.

At this point, both flaps e and f are folded into overlapped relation. The flap e projects outward from roll 182 as a result of the creasing and gripping operation. If it does not slant backward enough to come beneath flap f without further bending, it is bent backward sufficiently by coming into contact with the periphery of members 183. The folding of flap e is completed by pressing flap f down upon it. As shown, the flap f is folded in over the flap e. This is accomplished by means of the mechanism shown in Figs. 34 to 37 inclusive. The motion of the folding mechanism is entirely rotative. This feature is believed to be broadly new. The previous creasing of the flap causes it to stand out so as to be engaged by a rotating folder arm 180 secured to a shaft 181 driven at relatively high speed. This arm presses the flap part way in toward the creaser roll 163 and because of the laterally extended end portion 182 holds it in as the blank passes downward. This flap is next engaged by two segmental discs 183, 183 on the shaft 184 on either side of the arm 180 and beyond the same. The discs hold the flap f in this inwardly folded position until it engages the tape roll 173. This completes the forming of the bag.

The folder devices i. e., the arm 180, the discs 183 may both be considered segmental rolls.

The shafts 181 and 184 carrying the folding devices are geared to run at a higher speed than the creaser rolls. The shaft 181 carrying arm 180 should rotate at such speed that the flap will be folded far enough to be engaged by the second folders 183, when these are reached by the forward movement of the blank. The speed should not be unnecessarily excessive, because if so the arm tends to tear the paper of the flap engaged. The speed of the shaft 184 may be higher due to the relative positions of the flap and folders and the diameter of the folder. The shaft 181 and the shaft 184 may for example be geared to run respectively three and four times as fast as the small creaser roll shaft.

The blanks are carrier forward by the large creaser roll 163 and between it and the small tape roll 173 and the presser roll 191 and then between conveyor rolls 192, 193 to the guide 194 and onto a conveyor belt 195. The presser roll 191 is spring pressed toward the creaser roll 163 and the tension of the spring is preferably adjustable.

Tapes 197 run over the shaft of the second folder, over the tape roll 173, the roll 193 and around suitable idlers, as shown in Fig. 35. Two tapes 198 (Fig. 35) which engage grooves in the larger creaser roll 163 and run under the roll 192, pick the bags off from the cylinder 163. The presser roll is shown in detail in Fig. 52. As shown, the end portions engage the bag to press the same against the larger creaser roll, but the center portion is of smaller diameter and therefore does not substantially press the bag. Tape grooves are provided in the smaller central portion for the tapes 197.

The bags are not necessarily pressed sufficiently in the apparatus described to cause the pasted parts to be secured. The bags in folded condition with paste suitably applied, may be passed to the conveyor and held in folded condition by tapes and pressed in an auxiliary apparatus not herein described.

Suitable gearing connects the several parts to operate the same in synchronism and is arranged to permit relative adjustment to insure accurate synchronism of the several operations for making bags of different sizes. As shown, power is supplied to a power shaft 200 by means of fast and loose pulleys 201 carried by the main power shaft 200. The shaft 90 of the cut off mechanism is driven by means of the pinion 202 on the main shaft 200 meshing with the gear 203 on the shaft 90. The shaft 91 is driven from the shaft 90 by means of intermeshing gears. The upper one 204 is seen in Fig. 2. These gears are both of the same diameter, the gear 204 being circumferentially adjustable relative to its shaft to permit relative adjustment of the knife and slot bar, to insure meshing.

The tongue cutting mechanism is driven from the lower roll shaft 90 by means of a beveled gear 205 thereon meshing with a similar beveled gear 206 carried by the longitudinal shaft 49 from which the tongue cutting mechanism is driven, as hereinabove set forth. The feed roll shafts are driven from the knife shaft 90 by means of a change gear 207 on the knife shaft 90, an idler 207$^a$ and a gear 208 on the end of the lower feed roll shaft 209. The upper feed roll shaft is driven by a gear 210 meshing with the gear 208. The idler 207$^a$ is carried on an arm 211 pivoted on the lower roll shaft 209 and held in adjusted position by any suitable means. This permits the substitution of gears of different sizes for the change gear 207 to provide different speeds of drive for the feed rolls 15, 16. By this means, provision is made for feeding different lengths of tube between successive operations of the cut off knife, as required for the making of bags of different lengths. As hereinbefore explained, the knife and slot bar carrying rolls are sufficiently spaced to permit the slipping therebetween of the tube.

The pinch bar rolls are driven from the knife roll by means of an idler 214 meshing with the lower of a pair of gears 215, 216 on the pinch bar shafts. The gear 216 on the upper pinch bar shaft is adjustable circumferentially thereon to permit relative adjustment of the two pinch bars, as hereinabove explained. The gear 203 on the knife shaft drives an idler gear 217 from which the opening roll shafts are driven. As shown, the gear 218 on the lower opening roll shaft 219 meshes with said idler gear 217. The gear 218 is adjustable circumferentially on its shaft to provide adjustment which is desirable to insure correct relative timing of the opening rolls so that bags of different widths may be made. A pair of similar intermeshing gears are mounted near the opposite end of the roll shafts to drive the upper roll shaft 220 from the lower roll shaft. Only the upper gear 221 is shown in the drawings (Fig. 2). The crimping rolls 110 and the conveyor rolls 109 are driven from the lower roll shaft by a suitable train of gearing shown in plan view at the top of Fig. 2 and in elevation in Fig. 1. The shaft 225 carrying the coacher 22 is driven from the lower opening roll shaft 219 by means of the gear 226 meshing with a similar gear 229. The pasting rolls 155, 156, the conveyor rolls 175 and the creasing rolls 162, 163 with associated mechanism, are suitably driven from the gear (not shown) on the lower roll shaft 219, which gear meshes with the gear 221 shown in Fig. 2, includes the idler 230, meshing gears 231, 232, on the pasting roll shafts 233, 234 respectively, idler 235, gears 236 and 237 on the creaser roll shafts 238, 239 respectively. The conveyor rolls 175 are driven by an idler 240 and gears 241, 242 on the respective conveyor roll shafts. The paste roll 158 is driven at a relatively slow speed by a pinion 245 on the pasting roll shaft 234 meshing with a gear 246 on the pasting roll shaft. The rotating folders are driven from the gear 237 on the creaser roll shaft 239. As shown (Fig. 35) and for reasons heretofore set forth, the folding mechanism is driven at a relatively higher speed, the folder 182 may for example be driven at a speed of three times the speed of rotation of the creaser roll, by means of the gear 237, an idler 250 and pinion 251 on the folder shaft 181. The folder 183 is driven at a still higher speed of rotation to wit, four times the speed of rotation of the creaser roll 162, by means of an idler 252 meshing with the pinion 251 and with a pinion 253 on the folder shaft 184. The pinion 253 on the folder shaft 184 in turn drives the pinion 254 secured to the tape roll 173. The gearing and the size of the tape roll 173 are such that the surface speed thereof is substantially equal to the surface speed of the larger creaser roll with which it cooperates.

The presser roll 191 and conveyor rolls 192, 193 are suitably driven by gearing not shown. A hand wheel 260 is secured to the free end of the power shaft 200 to facilitate starting of the machine, when it is necessary to "inch along" the mechanism, as in threading in new paper.

It is to be noted that the body part of the frame of the machine is built on rectangular lines, but that nevertheless the machine is made to slant by means of leg castings suitably shaped for this purpose. Among other advantages, it brings the tongue knife mechanism and the paste box 42 to a relatively low and accessible position and also provides an arrangement whereby the paper is drawn along an upward incline over the former. These features are of practical advantage, as they simplify the work of attending the machine.

The arrangement of the various rolls throughout the machine is desirably such that the parts to which paste is applied are not pressed firmly together to cause any of the parts to adhere until all the creasing and folding operations are completed. Such arrangement prevents insecure pasting, due to stresses applied upon previously pasted parts. The arrangement is also such that at no point do the rolls press the side edges of the tube or other folds with such pressure as to break or unduly weaken the paper.

The adjustable features extend the range of use of machines embodying the invention to such an extent that machines of three sizes may be designed to make bags of all commercial sizes from 2 ounce bags to 60 pound bags.

It is a feature of the invention that the machine is designed so to fold the bag that in the finished bag the pasted lap seam extending longitudinally of the bag is folded as little as possible and is straight and flat from the top of the bag to the bottom, the necessary fold (that formed by the creaser of the opening rolls) being formed in the continuous side of the tube, as the bottom is folded up against such continuous side. This avoids forming a fold in the lap seam which is likely to cause a leak in the bag at that point, due to insecure pasting.

In the machine illustrated, the above folding is accomplished by the arrangement in which the sheet is folded downwardly around the folder and the blank is carried downwardly from the opening rolls in a way to fold the partially formed bottom up against the continuous side of the tube, leaving the seam side unfolded except as it is folded to form the bottom.

I claim as my invention:

1. In apparatus for making paper bags, in combination means for folding a continuous sheet to form a tube with a seam on one side, means for cutting said tube into lengths, and opening rolls having a creaser device arranged to crease a part of the length of tube to fold toward the continuous side thereof, said creaser device being shaped to avoid pressure upon the lap seam of the length of tube.

2. In tube forming apparatus of the character described, a former comprising a pair of spaced parallel members movable toward each other and a right and left hand screw connected thereto adapted to move said members simultaneously and symmetrically in opposite directions transversely with reference to the axis of the tube.

3. In tube forming apparatus of the character described, in combination, laterally movable former guides around which a sheet of paper is folded to form a tube, means for moving both members uniformly toward and from each other, a table above the end of the former members and between which and the former the tube runs, and a smoothing plate pressing toward the table beyond the former to smooth the tube.

4. In tube forming apparatus of the character described, in combination, a former around which in operation a sheet of paper is folded to form a tube, folding rolls acting to fold the paper inwardly around said former, a table above the former and between which and the former the paper runs, and a spring pressed member pressing toward the table beyond the former to smooth the tube.

5. In apparatus for forming paper into a tube, the combination, with feed rolls arranged to draw a continuous sheet of paper from a source of supply and means for folding said sheet into a tube, of a smoothing plate pressing against the formed tube and operative to smooth out wrinkles therein.

6. In apparatus for forming paper into a tube, the combination with means for feeding continuously a sheet of paper of indefinite length and a former about which the paper is folded to form a tube, of a fixed member and a spring pressed plate between which the tube passes and by which it is smoothed to remove wrinkles.

7. In apparatus for forming paper into a tube, the combination with a former and means to fold the paper thereabout to form a tube, of a fixed member and a spring pressed smoothing plate between which and the fixed member the formed tube passes, said smoothing plate being cut away at the center to avoid pressing the lapped edge portions.

8. A paper holding device comprising a plunger, a screw having a longitudinal hole therein removably fitted in said plunger and a pin tightly fitted in the hole in said screw.

9. In apparatus for making paper bags, a pair of opening rolls one of which serves, in cooperation with other elements, as a conveyor roll to carry the work forward, said roll having a pair of paper perforating pins and means to project and retract the pins by radial movement, the other opening roll having a pair of gripping fingers adapted to grip one thickness of a paper tube and pull it free from said pins.

10. In apparatus for making paper bags, a pair of opening rolls one of which serves, in cooperation with other elements, as a conveyor roll to carry the work forward, said roll having a pair of radial paper perforating pins, the other opening roll having a pair of gripping fingers adapted to grip one thickness of a paper tube and pull it free from said pins, and cam means for releasing said gripping fingers and for retracting radially said pins to release the work.

11. In apparatus for making paper bags, in combination, a former, means for folding a sheet of paper downward around the former to form a tube with lapped edges along its lower thickness, means for severing the tube into lengths, a pair of opening rolls arranged to open the end of a length of tube, one roll having gripping fingers arranged to engage the upper thickness of the tube and one having radial pins adapted to engage the lower thickness and means for folding the opened end to form a bag bottom.

12. In apparatus for making paper bags, an opening roll having radially extending paper engaging pins and means for projecting and retracting said pins by radial movement.

13. In apparatus for making paper bags, an opening roll having radially extending paper engaging pins and means for projecting and retracting said pins comprising a rock shaft and arms connected to said pins to move the same radially.

14. In apparatus for making paper bags, a pair of opening rolls, radially movable pins carried by one of said rolls and means for projecting and again withdrawing said pins during the period of engagement of a bag blank with said roll.

15. In a paper bag making machine, the combination with a pasting roll carrying a paste pad for applying paste to a predetermined portion of said bag, of a paste roll rotatably mounted in a paste box and means for driving said paste roll at a surface speed substantially slower than that of the pasting roll, said paste pad being rounded off along its forward edge to present a relatively rounded surface to a paste roll with which it contacts to receive paste therefrom.

16. In apparatus for making paper bags, means for carrying forward a partially folded bag blank having an outwardly directed, creased flap, segmental rolls arranged to engage the outwardly directed flap and means for driving said rolls at a surface speed greater than that of the bag blank to fold forward the outwardly directed flap.

17. In apparatus for making paper bags, means for forming a bag bottom comprising a rotatable blank carrier and rotatable, segmental, folding rolls and means for driving said rolls at relatively high speed to fold a bottom flap against the carrier.

18. In apparatus for making paper bags, in combination, means for folding a continuous sheet to form a tube, means for severing the tube into lengths with a tongue on one side at one end of each length, means for folding a tube end to make a partially formed bag bottom with oppositely extending flaps, means for creasing said flaps, rotatable segmental roll means arranged to fold the rear one of said flaps forwardly, and means for folding the forward flap rearwardly to complete a bag bottom, substantially as described.

19. In apparatus for making paper bags, in combination, means for folding a sheet to form a tube, means for folding an end of the tube to form a bag bottom, means for applying paste to the sheet in position to hold the bag folded, and means for delivering the folded bags, said folding and delivering means being relieved, where they contact the paper opposite paste, so that the pasted seams are not pressed.

20. In apparatus for making paper bags, the combination with a creaser roll of a presser roll arranged to press the folded blank against the creaser roll, said presser roll having its central portion of smaller diameter to avoid excess pressure against the central portions of the bag blank to which paste has been applied.

21. In combination with means for folding paper into a tube and for pasting the edges of the tube together, means for forming a bottom from the paper of the tube so as to make a bag, consisting of creaser mechanism and folding mechanism, the latter comprising members rotating about fixed axes and cooperating to fold flaps upon one another, with means for pasting the flaps, the creasing and folding mechanism being relieved where they contact the paper opposite paste, so that the pasted seams are not pressed.

22. In a paper bag machine, means to convey a length of paper tube, means to form a diamond fold in one end of the tube with a front flap and a rear flap, and means rotating about normally fixed axes for folding backward the front flap and folding forward the rear flap, and driving connections for the conveying means and folding means geared to drive the folding means at a surface speed greater than the speed of the conveyed bag.

23. In a paper bag machine, means to convey a length of paper tube, means to form a diamond fold in one end of the tube with a front flap and a rear flap, and segmental members rotating at a constant speed about a normally fixed axis for folding backward the front flap and folding forward the rear flap.

In testimony whereof, I have signed my name to this specification this 30th day of July 1921.

ALFRED C. COTY.